US008897128B2

(12) United States Patent
Bahadur et al.

(10) Patent No.: US 8,897,128 B2
(45) Date of Patent: Nov. 25, 2014

(54) CONGESTION MANAGMENT FOR FIBRE CHANNEL OVER ETHERNET OVER WIDE AREA NETWORKS

(75) Inventors: Nitin Bahadur, Santa Clara, CA (US); David Ward, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 97 days.

(21) Appl. No.: 13/482,441

(22) Filed: May 29, 2012

(65) Prior Publication Data

US 2013/0322236 A1 Dec. 5, 2013

(51) Int. Cl.
*H04L 12/26* (2006.01)

(52) U.S. Cl.
USPC .......... 370/230; 370/235; 370/235.1

(58) Field of Classification Search
CPC . H04L 12/4633; H04L 41/5009; H04L 43/10; H04L 45/50; H04L 47/12; H04L 47/17; H04L 47/26; H04L 47/29
USPC ............ 370/216–228, 230, 232, 395.5, 401, 370/229, 235, 235.1
See application file for complete search history.

(56) References Cited

U.S. PATENT DOCUMENTS

| | | | | |
|---|---|---|---|---|
| 7,525,911 | B2 * | 4/2009 | Hara et al. | 370/230.1 |
| 7,773,611 | B2 * | 8/2010 | Booth et al. | 370/401 |
| 7,876,681 | B2 * | 1/2011 | Pan et al. | 370/232 |
| 8,000,242 | B2 * | 8/2011 | Wang et al. | 370/235 |
| 2008/0151905 | A1 * | 6/2008 | Krzanowski | 370/395.5 |
| 2009/0037977 | A1 * | 2/2009 | Gai et al. | 726/1 |
| 2010/0103816 | A1 | 4/2010 | Eiro | |

FOREIGN PATENT DOCUMENTS

EP 1650905 A1 4/2006

OTHER PUBLICATIONS

Carrier Ethernet Access, RAD Data communication catalog, 2009.*
L. Martini, Encapsulation Methods for Transport of Ethernet over MPLS Networks, RFC 4448, Apr. 2006.*
Black et al., "Encapsulation Methods for Transport of Fibre Channel Traffic over MPLS Networks," Internet-Draft PWE3 WG, 2011 IETF Trust, May 3, 2011, 24 pgs.
Frost et al., "Packet Loss and Delay Measurement for MPLS Networks", Internet Engineering Task Force (IETF), RFC 6374, 2011 IETF Trust, Sep. 2011, 52 pgs.
"OAM functions and mechanisms for Ethernet based networks", International Telecommunication Union Y.1731, May 2006, 80 pgs.
"Fibre Channel Backbone-5 Rev. 2.00", International Committee for Information Technology Standards, Jun. 4, 2009, 180 pgs.

(Continued)

*Primary Examiner* — Kwang B Yao
*Assistant Examiner* — Harun Chowdhury
(74) *Attorney, Agent, or Firm* — Shumaker & Sieffert, P.A.

(57) ABSTRACT

In general, techniques are described for mapping WAN conditions to appropriate back-pressure mechanisms at the WAN edges to improve the performance of delay and/or loss-sensitive applications. In one example, a system includes a wide area network having a provider edge (PE) router to establish a Fiber Channel over Ethernet (FCoE) pseudowire over the wide area network. A Lossless Ethernet network attaches, by an attachment circuit, to the FCoE pseudowire at the PE router. A Fiber Channel Fabric connects to the Lossless Ethernet network and to a storage device that provides data for transmission over the wide area network by the FCoE pseudowire. The PE router detects a defect in the FCoE pseudowire and, in response to detecting the defect in FCoE pseudowire, injects an FCoE flow control extension into the Lossless Ethernet network by the attachment circuit.

25 Claims, 5 Drawing Sheets

(56) References Cited

OTHER PUBLICATIONS

Bryant et al., "Pseudo Wire Emulation Edge-to-Edge (PWE3) Architecture," Network Working Group, RFC 3985, The Internet Society 2005, Mar. 2005, 43 pgs.

IEEE Std. 802.3-2008, Part 3, Section 2, 2008, "Carrier Sense Multiple Access with Collision Detection (CSMA/CD) access method and Physical Layer specifications," pp. 741-751.

IEEE Std. 802.3bd-2011, Part 3, Amendment 8, "MAC Control Frame for Priority-based Flow Control", 2011, 31 pgs.

Search Report from European patent application 13152556.0, dated May 3, 2013, 11 pp.

Black et al., "Encapsulation Methods for Transport of Fibre Channel Traffic over MPLS Networks", RFC 6307, Internet Engineering Task Force, draft-ieft-pwe3-fc-encap-10.txt, Feb. 25, 2010, 18 pp.

"Fibre Channel—Backbone—5," American National Standard for Information Technology, Information Technology Industry Council—American National Standards Institute, Inc, US, vol. T11/Project 1871-D No. Rev. 2.00, Jun. 4, 2009, 180 pp.

"Converged networks with Fibre Channel over Ethernet and Data Center Bridging," Technology Brief, 3rd edition, Oct. 1, 2011, 7 pp.

Bryant et al., "Pseudowire Congestion Control Framework," draft-ietf-pwe3-congestion-frmwk-02.txt, Network Working Group, Internet—Draft, Jun. 17, 2009, 52 pp.

Roth et al., "Reliable Fibre Channel Transport Over MPLS Networks," draft-ietf-pwe3-fc-flow-00.txt, Internet Engineering Task Force, Jan. 15, 2009, 60 pp.

\* cited by examiner

CONGESTION MANAGMENT FOR FIBRE CHANNEL OVER ETHERNET OVER WIDE AREA NETWORKS

TECHNICAL FIELD

The invention relates to storage networks and, more specifically, to managing network congestion affecting storage networks.

BACKGROUND

A data center is a specialized facility that provides data serving and backup as well as other network-based services for subscribers and other entities. A data center in its most simple form may consist of a single facility that hosts all of the infrastructure equipment, such as networking and storage systems, servers, redundant power supplies, and environmental controls. Fibre Channel is a high-speed communications technology primarily used to interconnect storage systems and servers in a Storage Area Networks (SAN). Fibre Channel over Ethernet (FCoE) is a standard for encapsulating Fibre Channel traffic within Ethernet frames to, in effect, operate aspects of the SAN over an Ethernet network, which allows data center administrators to drastically reduce cabling among servers and storage systems and also permits server virtualization within the SAN. Fibre Channel technologies are described in "Fibre Channel Backbone-5 Rev. 2.00," International Committee for Information Technology Standards, Jun. 4, 2009, which is incorporated by reference as if fully set forth herein.

Because Fibre Channel has strict requirements respecting latency and does not employ a native frame retransmission protocol, Fibre Channel traffic requires a very low frame delivery loss rate. As a result, servers employing FCoE use appropriate Ethernet extensions, such as the Ethernet PAUSE mechanism, to reduce congestion within the SAN to provide lossless behavior similar to that provided by native Fibre Channel using a buffer-to-buffer mechanism.

More sophisticated data centers may be provisioned for geographically dispersed organizations using subscriber support equipment located in various physical hosting facilities (sites). As a result, techniques have been developed to extend Fibre Channel across multiple sites to provide storage replication for disaster recovery. Using the FCoE pseudowire model, for example, administrators may extend Fibre Channel links across a wide area Multiprotocol Label Switching (MPLS) network using one or more pseudowires that emulate an FCoE service between the multiple sites. In some implementations, the network devices that terminate a pseudowire for FCoE emulation establishes and maintains the pseudowire according to an FCoE-specific state machine. These termination devices transition among states of the state machine based on messages, exchanged between the termination devices, that indicate congestion within the WAN or overflowing buffer capacity on one or both of the termination devices, for example. For instance, a termination device may direct a remote termination device to cease transmitting FCoE traffic, until directed otherwise, by sending a PAUSE message (e.g., an Alternative Simple Flow Control (ASFC) PAUSE message) over the pseudowire connecting the termination devices.

SUMMARY

In general, techniques are described for mapping wide area network (WAN) conditions to appropriate back-pressure mechanisms, e.g., at edges of the WAN, to improve the performance of delay and/or loss-sensitive applications within the WAN. In some examples, the techniques include mapping Operation, Administration, and Maintenance (OAM) functions and mechanisms operating in-band on a pseudowire or Multiprotocol Label Switching (MPLS) Label Switched Path (LSP) within a WAN to Fibre Channel over Ethernet (FCoE) congestion-reduction mechanisms operating within Lossless Ethernet networks on the network edges. For instance, provider edge routers operating at respective edges of a wide area network operate a bidirectional LSP to emulate an Ethernet service between customer network sites using a pseudowire and thereby provide layer two (L2) connectivity between the sites. The customer network sites employ FCoE and exchange Ethernet-encapsulated Fibre Channel data traffic over the pseudowire. As a result, the pseudowire emulates a Fibre Channel link between respective Fibre Channel ports of the customer networks sites.

The provider edge routers may employ Operations, Administration and Maintenance (OAM) mechanisms to monitor L2 performance parameters of the point-to-point pseudowire. The provider edge routers may, for instance, execute an OAM session specific to the pseudowire, which terminates on the provider edge routers, to monitor Ethernet Frame Delay and Ethernet Frame Loss Ratio parameters of the pseudowire. Policies configured in the provider edge routers direct the provider edge routers to inject FCoE congestion mechanisms, such as Ethernet PAUSE mechanisms, downstream into the Lossless Ethernet-based customer network sites when the pseudowire parameter values exceed acceptable thresholds. By dynamically triggering FCoE congestion mechanisms based on the state of a wide area network connecting geographically dispersed data centers, as determined using OAM functions and mechanisms, the techniques may provide a generic and scalable solution toward improving the resiliency of the Fibre Channel data stream. Furthermore, because the provider edge routers may handle the congestion determination and congestion mechanisms, the techniques may be substantially transparent to the customer network sites, thus alleviating the responsibility of FCoE devices of the customer network sites to determine delays and/or other impediments within the WAN to reliable Fibre Channel data stream delivery.

In one example, a method includes establishing a service link from a network device to a remote network device, wherein the service link includes a pseudowire operating over a tunnel within a wide area network. The method also includes detecting a defect in the service link and, in response to detecting the defect in the service link, applying a congestion mechanism to a local edge network that is attached to the service link at the network device, wherein the congestion mechanism at least temporarily reduces an amount of service traffic within the wide area network that is issued by devices of the local edge network.

In another example, a network device includes a control unit having one or more processors. A management interface of the control unit receives configuration data defining a service link to a remote network device, wherein the service link includes a pseudowire operating over a tunnel within a wide area network, wherein a control plane of the control unit establishes the service link. A defect detection module of the control unit detects a defect in the service link and, in response to detecting the defect in the service link, applies a congestion mechanism for a local edge network that is attached to the service link at the network device, wherein the congestion mechanism at least temporarily reduces an amount of service traffic within the wide area network that is issued by devices of the local edge network.

In another example, a system includes a wide area network having a provider edge (PE) router to establish a Fibre Channel over Ethernet (FCoE) pseudowire within the wide area network. The system also includes a Lossless Ethernet network to attach, by an attachment circuit, to the FCoE pseudowire at the PE router. The system further includes a Fibre Channel Fabric connected to the Lossless Ethernet network and to a storage device that provides data for transmission over the wide area network by the FCoE pseudowire, wherein the PE router detects a defect in the FCoE pseudowire within the wide area network and, in response to detecting the defect in FCoE pseudowire, injects an FCoE flow control extension into the Lossless Ethernet network by the attachment circuit.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
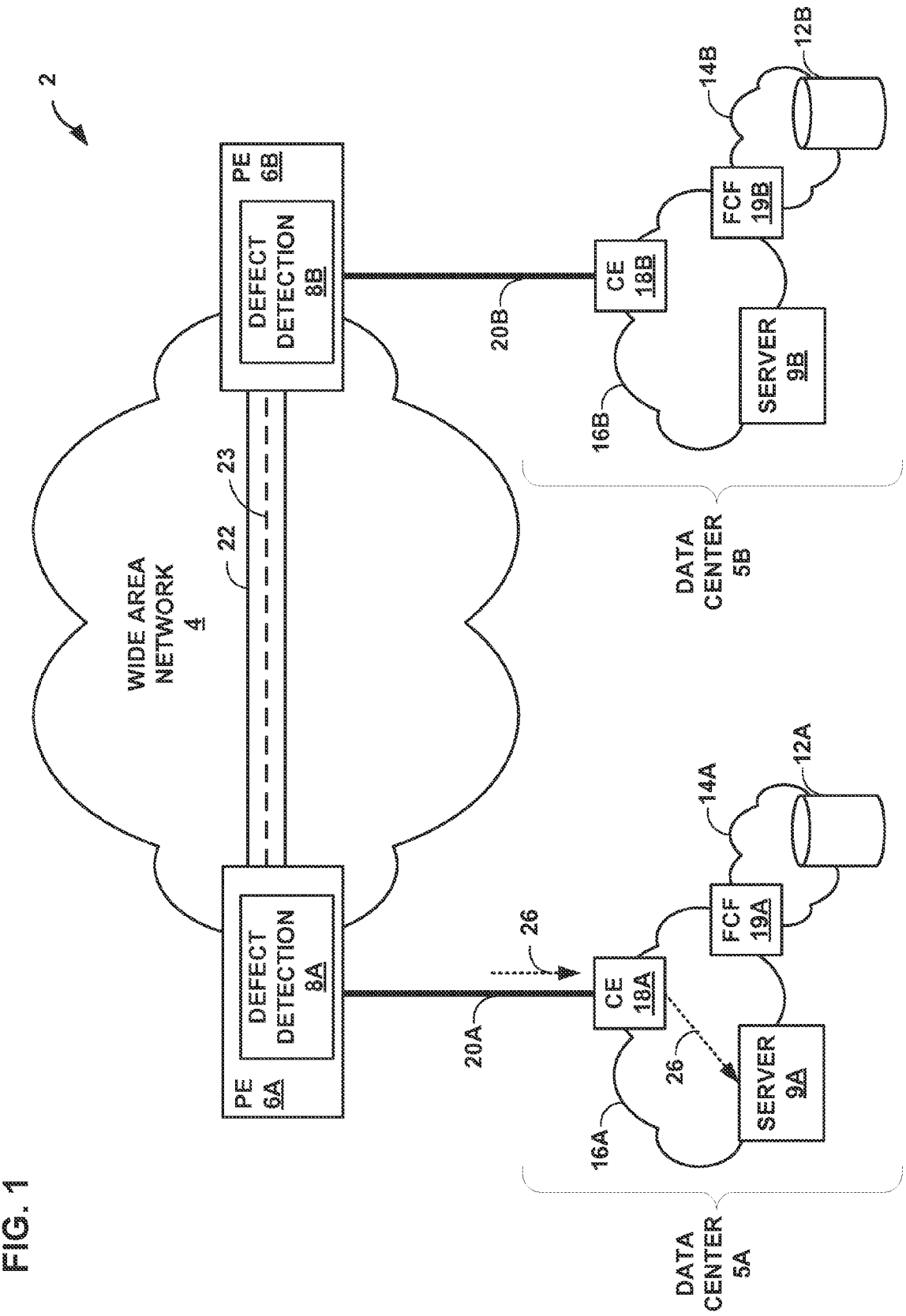
FIG. 1 is a block diagram illustrating an example network system in which edge routers of a wide area network inject edge network congestion mechanisms into the edge networks.

FIG. 1 is a block diagram illustrating an example network system in which edge routers of a wide area network inject edge network congestion mechanisms into the edge networks. As an illustrative application of this disclosure, edge routers of a wide area network 4 of network system 2 inject Fibre Channel over Ethernet flow control signaling mechanisms into a Fibre Channel network upon detecting congestion within the wide area network. In this example, network system 2 includes a wide area network (WAN) 4 having provider edge routers (PEs) 6A-6B (collectively, "PEs 6") by which respective customer edge devices (CEs) 18A-18B (collectively, "CEs 18") attach to exchange Fibre Channel data over the wide area network. Wide area network 4 represents a layer three (L3) network and may include multiple intermediate routing and switching devices (not shown) that transport L3 data traffic over L3 links connecting PE 6A and PE 6B. Wide area network 4 may implement Multiprotocol Label Switching (MPLS) techniques. In some instances, WAN 4 may represent an Asynchronous Transfer Mode (ATM) network. Thus, while described as a wide area network, WAN 4 may represent any network capable of transmitting L3 data traffic exchanged between PEs 6.

Data centers 5A-5B (collectively, "data centers 5") are edge networks having specialized facilities that provide storage, management, and dissemination of data to subscribers and other entities. With respect to PE 6A, data center 5A is a local edge network because data center 5A couples to PE 6A by attachment circuit 20A. Data center 5B, on the other hand, is a remote edge network because data center 5B couples to PE 6A by service link 23 within WAN 4. Subscriber devices (not shown) may connect to data centers 5 to request and receive data stored by storage devices of data centers 5. In some instances, data centers 5A, 5B are geographically dispersed facilities, or "sites," of an overall data center to provide geographical redundancy against localized failure of one of the data centers.

CE 18A of data center 5A represents a Lossless Ethernet switch operating within Lossless Ethernet (LE) network 16A to exchange Fibre Channel over Ethernet (FCoE) frames with FCoE Forwarder (FCF) 19A, server 9A, and PE 6A. That is, CE 18A transports both FCoE and Ethernet LAN traffic over LE network 16A. In some instances, CE 18A may represent an FCoE transit switch. An FCoE transit switch is a Layer 2 data center bridging (DCB) switch that transports FCoE frames. In general, CE 18A does not encapsulate or decapsulate Fibre Channel frames in Ethernet. Rather, CE 18A as an FCoE transit switch operates as a passthrough switch to transparently forward FCoE frames between server 9A and FCF 19A, which detects the connection to server 9A as a direct point-to-point link. An FCoE frame refers to an Ethernet frame that includes an FCoE packet data unit (PDU) that identified as FCoE Ethernet Type as encapsulating a byte-encoded Fibre Channel frame.

In some instances, another Lossless Ethernet switch of LE network 16A operates as an FCoE transit switch to bridge between FCF 19A and server 9A. FCoE traffic may be configured in the elements of LE network 16A (e.g., FCF 19A, server 9A, and any FCoE transit switches) to occupy one or more Virtual LANs of LE network 16A.

Storage area network (SAN) 14A represents a Fibre Channel Fabric SAN or other Fibre Channel-based network or Fibre Channel storage array having elements that implement Fibre Channel protocols to provide Fibre Channel services. Storage area network 14A includes storage device 12A that exchanges data with other elements of SAN 14A for storage/service. FCF 19A may represent a head device or top-of-rack (TOR) switch that includes an FCF entity to forward Fibre Channel frames using FCoE over LE network 16A, where the rack includes storage device 12A.

In some instances, CE 18A incorporates FCF 19A to connect directly to SAN 14A. In some instances, CE 18A exchanges FCoE traffic by LE network 16A with a separate FCoE switch that communicates with FCF 19A. In some instances, CE 18A is not an FCoE transport switch. For example, one or more traditional Ethernet switches may transport Ethernet traffic between an FCoE transport switch of LE network 16A and CE 18A.

Fibre Channel Forwarder 19A provides Fibre Channel services associated with a Fibre Channel switch. Fibre Channel Forwarder 19A additionally encapsulates Fibre Channel frames received from SAN 14A using FCoE encapsulation for forwarding toward server 9A or CE 18A as FCoE frames.

Fibre Channel Forwarder 19A decapsulates FCoE frames received from LE network 16A using FCoE decapsulation for forwarding as Fibre Channel frames toward storage device 12A.

Server 9A is an FCoE-capable server that obtains and sends/serves data stored by storage device 12A to entities external to LE network 16A. In addition, server 9A receives data from entities external to LE network 16A and stores the data to storage device 12A. More specifically, native Fibre Channel traffic from storage device 12A flows through SAN 14A to FCF 19A Fibre Channel ports, and FCF 19A encapsulates that traffic in Ethernet as FCoE traffic. The FCoE traffic flows through FCoE transit switches of LE network 16A to server 9A. Server 9A may then decapsulate the traffic to obtain the underlying Fibre Channel payload, which server 9A then manipulates for service according to the application to other devices, including devices external to LE network 16 (e.g., data center clients). In the other direction, FCoE traffic encapsulated by server 9A passes through FCoE transit switches of LE network 16A to the FCoE ports on FCF 19A. FCF 19A removes the Ethernet encapsulation from the FCoE frames to restore the native FC frames. Native FC traffic (i.e., Fibre Channel frames) travels out FCF 19A Fibre Channel ports to storage device 12A in the Fibre Channel SAN 14A, which stores the underlying Fibre Channel payloads of the Fibre Channel frames. Server 9A may include an application server, such as a web server. Server 9A may include one or more Converged Network Adapters to support both Fibre Channel and traditional Ethernet traffic. Some instances of network system 2 may not include server 9A, 9B. In such instances, FCFs 19A-19B (collectively, "FCFs 19") may communicate transparently over WAN 4 and LE networks 16A-16B (collectively, "LE networks 16") using a virtual point-to-point Fibre Channel link.

As used herein, a "Lossless Ethernet network" refers to an Ethernet network that include network elements that implement extensions to avoid, at least to an extent greater than that provided by a generic Ethernet network, discarding frames in the presence of congestion. Lossless Ethernet networks, such as LE networks 16, may include network elements that incorporate full duplex Lossless Ethernet MACs that implement such extensions to avoid Ethernet frame loss due to congestion, as well as Lossless Ethernet bridging functions operating across Lossless Ethernet MACs and full duplex links connecting the various network elements. CEs 18, FCFs 19, and servers 9 may include such network elements.

Example Ethernet flow control extensions by which LE networks 16 elements enable a full duplex Ethernet link to provide a lossless behavior substantially equivalent to that provided by the buffer-to-buffer credit mechanism of conventional Fibre Channel fabrics. Example Ethernet flow control extensions may include the Ethernet PAUSE mechanism and an extension of the Ethernet PAUSE mechanism known as Priority-based Flow Control (PFC). The Ethernet PAUSE mechanism is defined in IEEE Std. 802.3-2008, Part 3, section 2, "Carrier Sense Multiple Access with Collision Detection (CSMA/CD) access method and Physical Layer specifications," 2008, pages 741-751 being incorporated herein by reference. Priority Flow Control is described in IEEE Std. 802.3bd-2011, Part 3, Amendment 8, "MAC Control Frame for Priority-based Flow Control, 2011, the entire contents of which are incorporated by reference herein. In general, the Ethernet PAUSE and PFC mechanisms allow a receiving element of the link to control a transmission rate of the sending element by sending an Ethernet control frame directing the sending element to halt data frame transmission for a specified amount of time. In the illustrated example of FIG. 1, sending and receiving elements may refer to any element that forwards FCoE traffic, including servers 9, FCFs 19, CEs 18, and PEs 6. Thus, for example, FCF 19A may issue an Ethernet PAUSE frame to server 9A directing the server to halt FCoE frame transmission toward FCF 19A for a specified time. In this way, FCF 19A may control the flow of Ethernet frames in LE network 16A to reduce and, in some cases, eliminate congestion in LE network 16A.

Alternatively or additionally, elements of LE network 16A may use other flow control mechanisms for Lossless Ethernet. For example, LE network 16A may use Enhanced Transmission Selection (ETS), Data Center Bridging eXchange (CDBX), Congestion Notification (CN).

The description above with respect to elements of data center 5A applies, mutatis mutandis, to corresponding elements of data center 5B. For example, CE 18A of data center 5A performs functions similar to CE 18B of data center 5B, LE network 16A performs functions similar to LE network 16B, and so on. While illustrated as having similar topologies, data centers 5A, 5B may have varying numbers of each type of illustrated element (e.g., servers, FCFs, and storage devices) arranged in varying topologies.

Data centers 5A, 5B exchange FCoE traffic over WAN 4. In the illustrated example, data centers 5A, 5B exchange FCoE traffic over WAN 4 according to an FCoE pseudowire model in which PEs 6 establish pseudowire 23 over packet-switched network (PSN) tunnel 22 and bridge pseudowire traffic over respective attachment circuits 20 to emulate an FCoE service for transparently connecting CEs 18 to one another. CEs 18 may originate and/or terminate the Ethernet service such that CEs 18 are unaware that the FCoE service is emulated rather than native. In this way, administrators may extend Fibre Channel links (in the form of point-to-point FCoE connections) across WAN 4 to provide storage replication and/or other services between data centers 5A, 5B, for example. Ethernet service emulation with pseudowires is described in additional detail in "Pseudo Wire Emulation Edge-to-Edge (PWE3) Architecture," Request for Comments: 3985, Network Working Group (Bryant and Pate, ed.), March, 2005, which is incorporated by reference as if fully set forth herein. An example of FCoE service emulation is described in additional detail in "Encapsulation Methods for Transport of Fibre Channel Traffic over MPLS Networks," David Black and Linda Dunbar (ed.), May, 2011, which is incorporated by reference as if fully set forth herein.

Each of ACs 20 is a physical or virtual circuit attaching one of CEs 18 to one of PEs 6 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Attachment circuits 20 may each include a direct link or an access network. In some instances, CE 18A and PE 6A, for example, may occupy a single network device. In such instances, attachment circuit 20A may represent an interface.

Tunnel 22 may represent a GRE tunnel, an IPSec tunnel, an L2TP tunnel. Where WAN 4 is an MPLS network, tunnel 22 may represent an LSP. Tunnel 22 may carry service traffic for one or more pseudowires in addition to pseudowire 23. Where WAN 4 is an ATM network, tunnel 22 may represent an ATM circuit.

PEs 6 include defect detection modules 8A-8B (collectively, "defect detection modules 8") that monitor pseudowire 23 and/or tunnel 22 for defects. Defect detection modules 8 may maintain transmission/receipt statistics and other metrics and exchange messages to determine whether a service link (e.g., pseudowire 23 specifically or underlying tunnel 22) is operational (or "up"), a service link transmission delay, a loss ratio at which FCoE frames transmitted via the service link fail to arrive at their intended destination, and so on. A link that is not operational (or "down") or has service link transmission delay or loss ratio that exceeds a threshold indicates a defect in the service link. For example, defection detection modules 8 may implement a process referred to as Operations, Administration and Maintenance (OAM), which provides the activities, tools, standards and other techniques that involve operating, administering and maintaining connectivity in an L2 computer network such as the emulated FCoE service provided by PEs 6 using pseudowire 23 over tunnel 22.

In accordance with techniques described herein, defect detection modules 8 translate defects detected in a service link to congestion mechanisms of respective data centers 5 to at least temporarily reduce service traffic from data centers 5 within the wide area network. In the illustrated FCoE-based example, defect detection module 8A may identify a defect in pseudowire 23 or tunnel 22. Responsive to identifying the defect and to release pressure on the service links, defect detection module 8A may inject FCoE flow control extensions used by LE network 16A to provide lossless Ethernet behavior to at least temporarily reduce FCoE traffic from LE network 16A. Here, "inject" refers to introducing a message or other signal into the LE network 16A that would conventionally be provided by elements of LE network 16A and not by an outside element, such as PE 8A. Defect detection module 8A upon detecting a defect sends, via attachment circuit 20A, back pressure message 26 to CE 18A. In some examples, back pressure message 26 represents an Ethernet PAUSE frame or a PAUSE-ON frame for a particular class of service (CoS) in accordance with Priority-based Flow Control. Defect detection module 8A may broadcast back pressure message 26 on attachment circuit 20A. Defect detection module 8A may alternatively or additionally use any of the above-described flow control mechanisms that enable Lossless Ethernet (or equivalents thereof) to inject congestion-ameliorating back pressure messages toward LE network 16A.

CE 18A responds to back pressure message 26 by reducing the amount of service traffic outbound on attachment circuit 20A. For example, CE 18A may buffer outbound service traffic in a computer-readable storage medium until CE 18A receives a flow control message from PE 6A indicating the defect is resolved. In this way, CE 18A at least temporarily reduces the amount of service traffic issued by LE network 16A proceeding to PE 6A and thereafter to WAN 4. In the illustrated example, CE 18A forwards back pressure message 26 (or a representation thereof) to server 9A. Server 9A may respond to back pressure message 26 by itself buffering outbound service traffic intended for transport over pseudowire 22 or tunnel 23 or by reducing the data rate for the application being performed by server 9A that is generating the outbound service traffic. Again, with reference to the illustrated example, the application may represent data replication to remote data center 5B that is a remote edge network. However, although described in the context of data replication or transmission between geographically diverse data centers 5 employing FCoE-based LE networks 16, the techniques are applicable to other delay and loss-sensitive applications, such as content delivery, Voice over IP (VoIP) or other real-time media applications, and distributed processing applications (e.g., scientific computing). In such instances, data center 5A may receive and respond to request from a remote network device (not shown), such as a desktop/laptop computer, tablet, television set-box, gaming console, storage server, web application or other application server, smart phone, or mobile phone.

By translating defects in WAN 4 at PEs 6, the techniques of this disclosure provide an extensible mechanism for dynamically triggering application-independent congestion reduction mechanisms within the edge that may be application-independent as well as highly scalable. That is, rather than relying on application-specific techniques for flow control, such as the FCoE-specific state machine for pseudowire establishment and maintenance, the techniques may allow defect detection module 8 to dynamically trigger FCoE congestion mechanisms based on determining the condition of WAN 4 using an application-independent process (e.g., OAM). In the illustrated example, these techniques may therefore provide a generic and scalable solution toward improving the resiliency of the Fibre Channel data stream. Furthermore, because the provider edge routers may handle the congestion determination and congestion mechanisms, the techniques may be substantially transparent to data centers 5, thus alleviating the responsibility of the LE network 16 devices to determine losses and/or other impediments within WAN 4 to reliable Fibre Channel data stream delivery.

Figure 2:
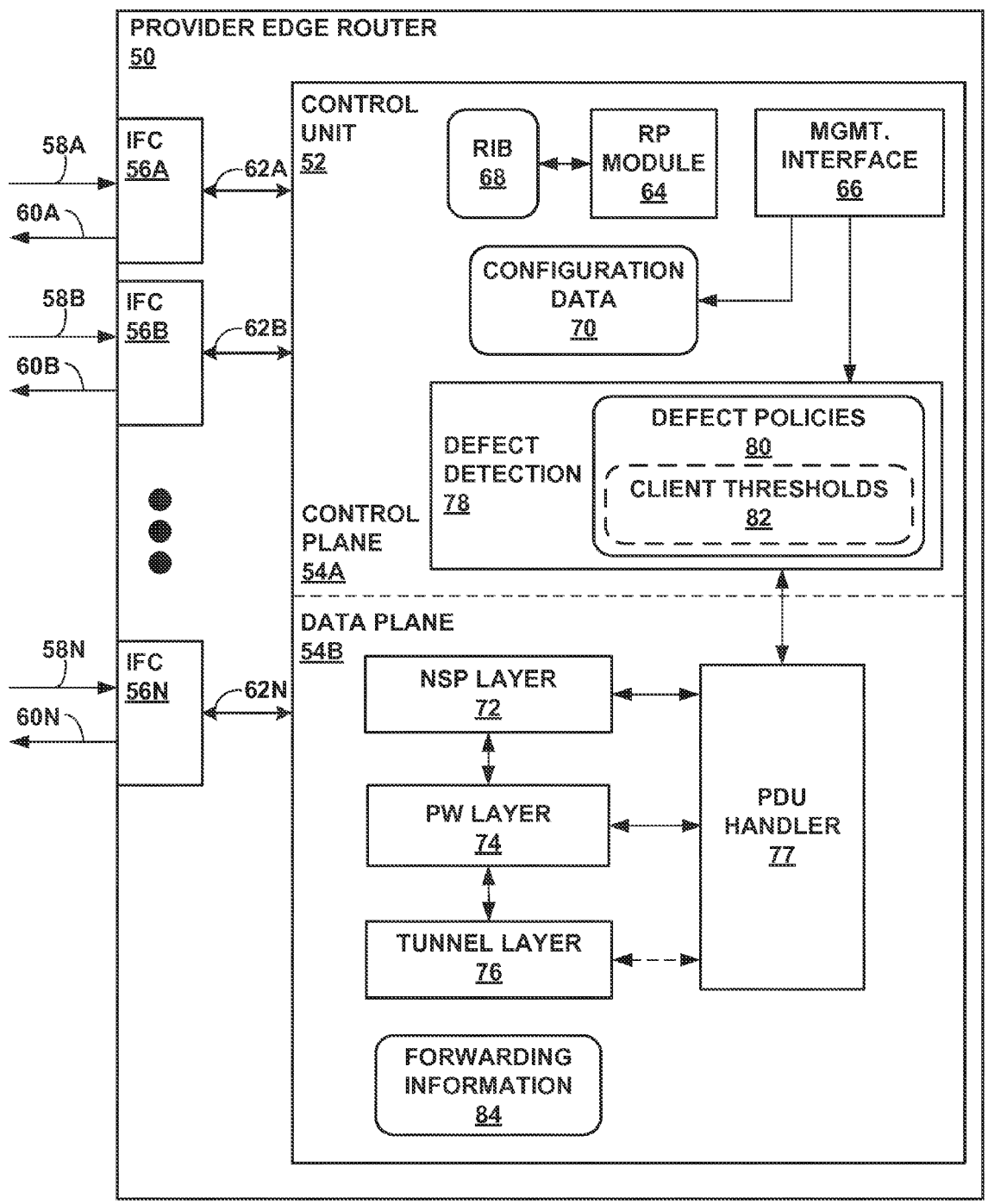
FIG. 2 is a block diagram illustrating an example provider edge router to detect defects within a wide area network and inject congestion mechanisms into an edge network to reduce traffic over a service link in accordance with techniques described herein.

FIG. 2 is a block diagram illustrating an example provider edge router to detect defects within a wide area network and inject congestion mechanisms into an edge network to reduce traffic over a service link in accordance with techniques described herein. For purposes of illustration, provider edge (PE) router 50 may be described herein within the context of example network system 2 of FIG. 1 and may therefore represent any of PEs 6. Moreover, while described with respect to a particular network device, e.g., a router, the techniques may be implemented by any network device that may operate as a service endpoint, such as a Layer 3 (L3) or L2/L3 switch or server. The techniques should therefore not be deemed limited to the example embodiments described in this disclosure.

PE router 50 includes a control unit 52 and interface cards 56A-56N ("IFCs 56") coupled to control unit 52 via internal links 62A-62N. Control unit 52 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 52 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 52 is divided into two logical or physical "planes" to include a first control or routing plane 54A and a second data or forwarding plane 54B. That is, control unit 52 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 54A of control unit 52 executes the routing functionality of router 50. Routing protocol (RP) module 64 of control plane 54A implements one or more routing protocols by which routing information stored in routing information base 68 ("RIB 68") may be determined. RIB 68 may include information defining a topology of a network, such as WAN 4. Control plane 54A may resolve the topology defined by routing information in RIB 68 to select or determine one or more routes through the network. Control plane 54A may then update data plane 54B with these routes, where data plane 54B maintains these routes as forwarding information 84.

Control plane 54A further includes management interface 66 (illustrated as "mgmt. interface 66") by which a network management system or an administrator using a command line or graphical user interface, for example, configures one or more service instances for a network to interconnect remote customer networks into a single Ethernet domain using pseudowires over a wide area network. Configuration data 70 stores configuration data for the service instances to a computer-readable storage medium, and control plane 54A configures forwarding information 84 using the stored configuration data to control the functionality of native service processing layer 72, pseudowire layer 74, and tunnel layer 76 of data plane 54B.

Forwarding or data plane 54B represents hardware or a combination of hardware and software of control unit 52 that provide high-speed forwarding of network traffic, received by IFCs 56 via inbound links 58, to outbound links 60 in accordance with forwarding information 84. Data plane 54B may include one or more forwarding units that each include, for example, one or more packet forwarding engine ("PFE") coupled to respective interface cards. A forwarding unit may each represent, for example, a dense port concentrator (DPC), modular port concentrator (MPC), flexible physical interface card (PIC) concentrator (FPC), or another line card, for example, that is insertable within a PE router 50 chassis or combination of chassis.

Native service processing (NSP) layer 72, pseudowire (PW) layer 74, and tunnel layer 76 of data plane 54B process and forward received network traffic associated with NSP instances in which router 50 participates in accordance with forwarding information 84. Each of NSP layer 72, PW layer 74, and tunnel layer 76 represents hardware components or a combination of hardware and software components of data plane 54B to implement the respective functionality of the layer.

Tunnel layer 76 provides tunneling services to deliver one or more pseudowires over a packet-switched network (e.g., WAN 4) to additional routers participating in NSP instances. A single tunnel may carry one or more pseudowires. Control plane 54A may perform setup, maintenance, and tear-down signaling for tunnels underlying pseudowires of the NSP instances. Tunnels implemented by tunnel layer 76 may include LSPs as well as GRE, L2TP, and IPsec tunnels. Tunnel layer 76 receives outbound pseudowire traffic and a specified tunnel identifier from pseudowire layer 74 and outputs the traffic in accordance with the specified tunnel. Tunnel layer 76 delivers pseudowire packets received via a tunnel to PW layer 74.

Pseudowire layer 74 selects NSP instances to process received pseudowire packet data unit (PDU) based on the respective pseudowire (or "service") label of the packet. That is, upon receiving a pseudowire-labeled packet from tunnel layer 76, PW layer 74 strips the pseudowire label from the PDU and selects the NSP instance associated with the pseudowire identified by the label. In other words, the PW layer 74 uses the attached pseudowire label to demultiplex the PDU for handling by NSP layer 72 according to an appropriate Layer 2 virtual private network (L2VPN) instance or VPLS instance. Pseudowire layer 74 additionally receives outbound PDUs and pseudowire identities from NSP layer 72, maps the pseudowire identities to outbound pseudowire labels for the pseudowires, attaches the outbound pseudowire labels to the PDUs, and sends the pseudowire traffic to tunnel layer 76 for output in packet-switched network tunnels that carry the pseudowire.

NSP layer 72 performs bandwidth and/or other optimizations or modifications to the emulated service protocols to improve a performance of the service over the service link (e.g., a pseudowire for the service). For example, when emulating an FCoE service, NSP layer 72 may perform Idle Suppression to avoid sending Fibre Channel Idle signals over the service link and Fibre Channel Primitive Sequence Reduction to send only a selected number of repetitive Fibre Channel Primitive Sequences over the service link. NSP layer 72 may also perform Alternate Simple Flow Control (ASFC) protocol for FCoE pseudowire encapsulation in conjunction with congestion reduction techniques described herein.

NSP layer 72 may include one or more service instances (not shown) for each of one or more clients of a service provider that employs PE router 50. A service instance is associated with a particular emulated service that is itself associated with an attachment circuit coupled to a client network (or "customer network"), such as one of data centers 5 of FIG. 1. A service instance may represent an L2 Virtual Private Network (L2VPN) instance or a Virtual Private LAN Service instance (VPLS). A service instance may be associated with a MAC table that maps learned L2 address to outbound interfaces of IFCs 56 as well as a pseudowire table that associates service links with attachment circuits (and, by extension, with client networks thereof).

Defect detection module 78 of control plane 54A translates defects detected in a service link to congestion mechanisms of an attached client network. Defect detection module 78 may represent any of defect detection modules 8 of FIG. 1. Management interface 66 receives and configures defect detection module 78 with configuration data that controls the operation of defect detection module 78 for injecting congestion mechanism into a client network in response to congestion in the WAN. While illustrated as logically located in data plane 54B, aspects of defect detection module 78 may in some instances be logically located in control plane 54A.

Defect detection module 78 exchanges measurement PDUs with other devices of the wide area network to identify defects in the network. In particular, defect detection module 78 interfaces, in conjunction with PDU handler 77 of data plane 54B, with pseudowire layer 74 to send and receive service PDUs that include control information by which defect detection module 78 may identify defects in pseudowires. Such defects, as mentioned above, may include nonoperational pseudowires or unacceptable delays or PDU-loss along the pseudowires.

PDU handler 77 cooperates with defect detection module 78 to monitor the performance of pseudowires and/or tunnels operating within a wide area network. For example, to determine PDU (or Frame) loss between two service endpoints that offer L2 service connectivity to a pair of edge networks, PDU handler 77 may maintain transmit and receipt counters for tracking the number of service PDUs sent and received by PE router 50, respectively, to the remote service endpoint. Defect detection module 78 communicates with the remote service endpoint to exchange transmit and receipt counter values and compute differences between a number of PDUs received at egress service endpoints and PDUs transmitted at ingress service endpoints. In one example, defect detection module 78 reads transmit and receipt counter values maintained by PDU handler 77 for a pseudowire and additionally receives remote transmit and receipt counter values for the pseudowire from a remote network device that operates the remote pseudowire endpoint. Using the read and received counter values, defect detection module 78 computes, for the pseudowire, PDU loss measurement statistics based on the differences between transmit and receipt counter values for each direction of PDU traffic between the pseudowire endpoints. As another example, to determine PDU delay, defect detection module 78 may direct PDU handler 77 measure frame delay or frame delay variation. In some instances, PDU handler 77 independently monitors PDU delay and provides updates to defect detection module 78. Aspects of functionality of defect detection module 78 and PDU handler 77 may be performed, in various instances, alternatively in control plane 54A or data plane 54B. For example, defect detection module 78 may maintain transmit and receipt counters rather than PDU handler 77.

In some embodiments, aspects of data plane 54B are distributed to a number of distributed forwarding units, such as packet forwarding engines, each associated with a different one or more IFCs 56. In these embodiments, PDU handler 77 may be distributed to the distributed forwarding units to enable high-speed pseudowire and/or tunnel performance monitoring within the data plane.

Defect policies 80, stored to a computer-readable storage medium, define one or more policies for handling defects on pseudowires. Each of defect policies 80 defines a defect condition and a corresponding congestion mechanism to apply on occurrence of the condition. Defect detection module 78 monitors performance metrics of one or more pseudowires terminated by PE router 50, uses the performance metrics to look up policy conditions defined in defect policies 80 for the pseudowire, and, upon identifying a policy having a condition satisfied by the performance metrics, applies the corresponding congestion mechanism. Defect policies 80 may be specific to individual pseudowires operated by PE router 50. That is, different pseudowires operated by PE router 50 may be associated with different subsets of defect policies 80, such that the performance metrics monitored and respective thresholds triggering a "defect" for the metrics may be different for each pseudowire.

In some examples, such as when PE router 50 provides FCoE pseudowire encapsulation services and/or other Ethernet emulation services, defect detection module 78 may monitor L2 performance metrics and verifies operation using a process referred to as Operations, Administration and Maintenance (OAM), which generally provides the activities, tools, standards and other techniques that involve operating, administering and maintaining connectivity in an L2 computer network, including measuring Ethernet Frame transmission metrics. One such OAM tool, referred to as OAM Frame Loss Measurement, standardizes mechanisms for loss measurement in an Ethernet computer network. Another such OAM tool is referred to as OAM Frame Delay and standardizes mechanisms for frame delay measurement in an Ethernet computer network. OAM Frame Loss Measurement and Frame Delay Measurement are described in the Internal Telecommunication Union Telecommunication Standardization Section (ITU-T) recommendation Y.1731, "OAM functions and mechanisms for Ethernet based networks," May, 2006, which is incorporated by reference herein in its entirety. OAM Frame Loss Measurement, as described in ITU-T Y.1731, Section 8, defines the Frame Loss Ratio performance metric to apply to Ethernet frames admitted at the ingress L2 flow point of an L2 connection and delivered to the egress L2 flow point of the L2 connection. OAM Frame Delay Measurement, as described in ITU-T Y.1731, Section 8, defines the Frame Delay and Frame Delay Variation metrics that may include round-trip or one-way delays for an Ethernet frame transmitted on an L2 connection. The L2 connection may, in the context of this disclosure, refer to a pseudowire that provides pseudowire emulation and/or, in some instances, to the tunnel over which one or more pseudowires operate. As such, the L2 connection may refer to pseudowire 23 (an FCoE-based connection) or tunnel 22 of FIG. 1. While described primarily herein as using ITU-T Y.1731-based techniques, defect detection module 78 may alternatively use other techniques for performance monitoring, such as those described in Frost and Bryant, "Packet Loss and Delay Measurement for MPLS Networks," Internet Engineering Task Force, Request for Comments 6374, which is incorporated by reference herein in its entirety.

In instances of PE router 50 that use OAM for performance monitoring, defect detection module 78 maps any of the OAM Frame Loss Ratio, Frame Delay, and Frame Delay Variation metric values to entries in defect policies 80. If an entry satisfies any such metric value, a defect exists and defect detection module 78 applies the corresponding congestion mechanism for the defect. Congestion mechanisms may include, for example, originating and injecting an Ethernet PAUSE frame or one or more PAUSE-ON frames for respective Classes of Service to the appropriate service instance of NSP layer 72 for transmission on an attachment circuit to a client network that is attached to the service instance. Another congestion mechanism may include buffering outbound service traffic in PE router 50 using a memory buffer until defect detection module 78 determines the congestion is relieved. Using OAM functions and mechanisms in this manner may provide a generic and scalable solution toward improving the resiliency of service data traffic. For example, in the FCoE context, rather than relying on an application-specific state machine that maintains a pseudowire for carrying FCoE traffic, the techniques described herein provide a generic mechanism for defect detection that may be used for many different applications. This may reduce a complexity of PE router 50 and therefore reduce operation expenditures for the service provider that employs PE router 50.

Again, in instances of PE router 50 that use OAM for performance monitoring, defect detection module 78 in cooperation with PDU handler 77 may implement one or more of maintenance entity group endpoints (MEPs) that serve service or tunnel endpoints that send/receive pseudowire or tunnel PDUs. A maintenance entity (ME), as described for example in ITU-T Y.1731 incorporated above, refers to a single point-to-point (P2P) Ethernet connection, such as that provided at the customer-facing interfaces of a virtual circuit to implement a P2P L2VPN, such as a service instance in which PE router 50 participates and as implemented by NSP layer 72. Each ME for an Ethernet service connection terminates at one of the points of the Ethernet service connection.

Defect detection module 78 in cooperation with PDU handler 77, operating as an MEP, exchange endpoint PDU counter values to measure PDU loss using the messaging protocol described in ITU-T Y.1731, incorporated above. The MEP may perform single-ended and/or dual-ended PDU performance measurement.

In some cases, a tunnel in WAN 4 carries multiple pseudowires that emulate multiple services for one or more client networks. For example, PE router 50 may multiplex multiple pseudowires to a single tunnel (e.g., an LSP) that transports all emulated service traffic for the pseudowires between PE router 50 and another PE router. Each such pseudowire may be associated with a different attachment circuit for a different client or different client service. In such cases, congestion experienced by the tunnel affects all pseudowires carried by the tunnel.

Client thresholds 82 is illustrated in FIG. 2 as an optional data structure by which an administrator or a client may configure client-specific thresholds for one or more performance metrics for each pseudowire operating over a single tunnel through a WAN. Defect detection module 78 in cooperation with PDU handler 77 in such cases may alternatively monitor performance metrics of the tunnel and thereby avoid monitoring performance metrics of each pseudowire operating over the tunnel. When a performance metric exceeds a client threshold defined for a client in client thresholds 82, defect detection module 78 may apply congestion mechanisms specified for that client to that client's network, which may include sending an Ethernet PAUSE frame on an attachment circuit to that client's network. Because different clients and different applications have different thresholds for acceptable congestion in the WAN, these techniques may allow each client/application to, in effect, specify their respective threshold as well as register a callback defining a congestion mechanism for the client/application. Clients may register the callback using management interface 66 to define one of defect policies 80.

Figure 3A:
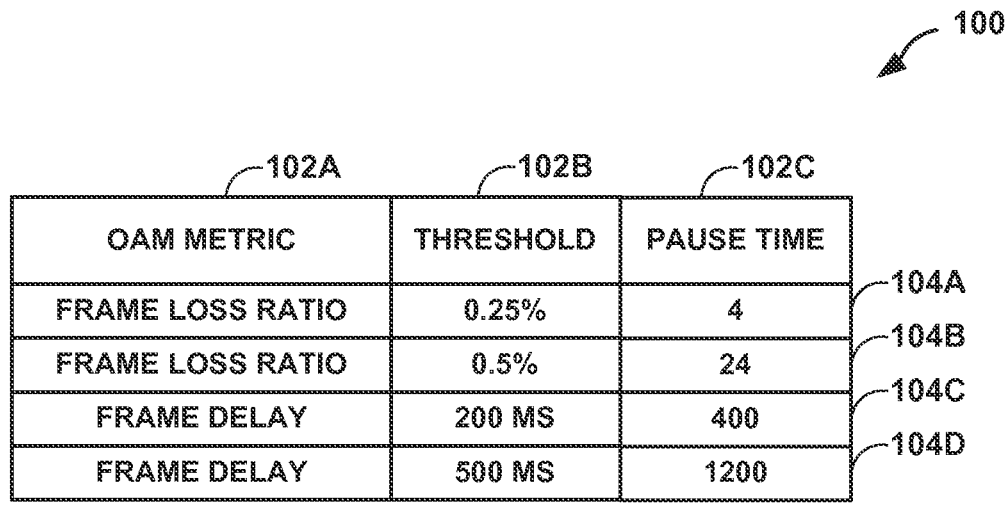
FIGS. 3A-3B depict tables that include example defect policies defining congestion mechanisms to be applied upon detection of WAN defects.

FIG. 3A is a table that depicts example defect policies defining congestion mechanisms to be applied upon detection of WAN defects. Defect policies table 100 may represent a subset of defect policies 80 of FIG. 2. Defect policies table 100 includes policies 104A-104D (collectively, "policies 104") each having a condition and an action. Defect detection module 78 may apply policies 104 to a monitored pseudowire over a WAN to identify defect and apply congestion mechanisms.

Conditions for policies 104 are defined OAM performance metric field 102A and threshold field 102B. Actions for policies 104 are defined by pause time field 102C. OAM performance metric field 102A values specify types of OAM performance metrics monitored for policies 104, while threshold field 102B values specify threshold values for the corresponding type of OAM performance metric specified in OAM performance metric field 102A. For example, the condition for policy 104A is satisfied when the Frame Loss Ratio on the monitored pseudowire exceeds 0.25%.

On determining that a condition defined in one of policies 104 is experienced by the monitored pseudowire, defect detection module 78 applies the corresponding action. Continuing the above example, when the Frame Loss Ratio on the monitored pseudowire exceeds 0.25%, defect detection module 78 inject a PAUSE frame specifying a pause value of "4" (in accordance with pause time field 102C of policy 104A) into a Lossless Ethernet network, such as one of LE networks 16 of FIG. 1. In various examples, policies 104 may define actions including any of the congestion mechanisms mentioned above, e.g., buffering and back-pressure.

Defect detection module 78 may apply defect policies table 100 in descending order of severity of the condition. For example, because a Frame Loss Ratio of 0.5% is greater than a Frame Loss Ratio of 0.25%, defect detection module 78 may test the condition defined by policy 104B. If the policy 104B condition is unsatisfied, only then does defect detection module 78 test the condition defined by policy 104A. In some examples, increasing severities of the condition may correlate to increasing severity of action defined by policies 104. For instance, low congestion on a pseudowire may cause defect detection module 78 to inject a PAUSE-ON frame into merely the "best effort" class of service in accordance with policies 104, while increasing amounts of congestion cause defect detection module 78 to subsequently inject a PAUSE-ON frame that increases the PAUSE-ON time or the class of service affected.

Figure 3B:
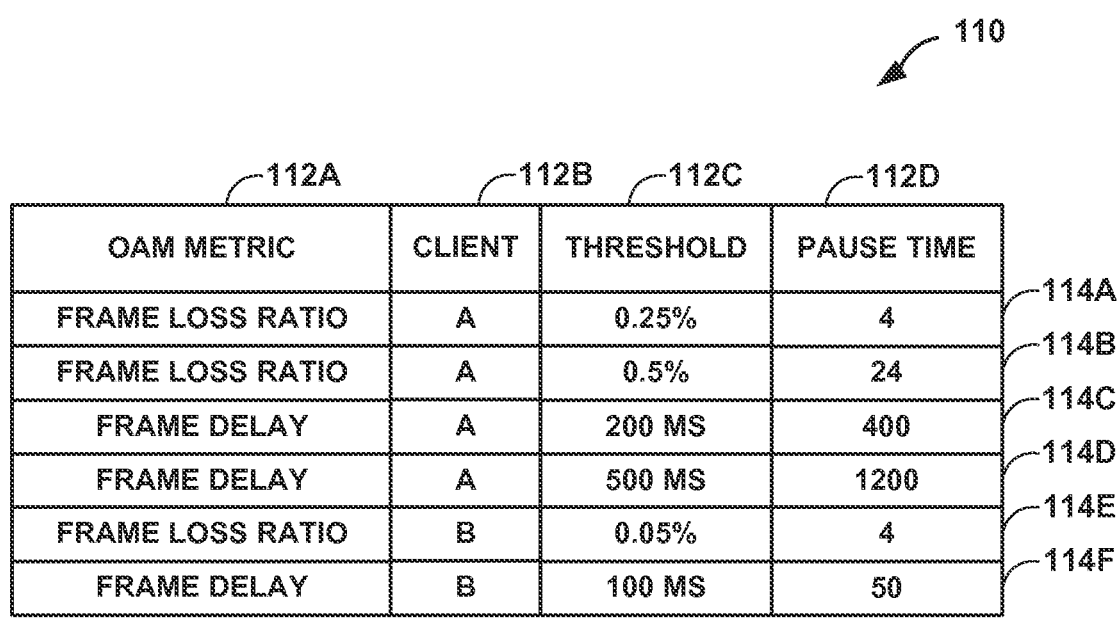

FIG. 3B is a table that depicts example defect policies defining congestion mechanisms to be applied upon detection of WAN defects in a tunnel. Defect policies table 110 may represent a subset of defect policies 80 of FIG. 2. Defect policies table 110 includes policies 114A-114D (collectively, "policies 114") each having a condition and an action. Defect policies 114 of FIG. 3B are similar to defect policies of 104 but include an additional client field 112B specifying a client of the tunnel that is affected by the action defined for the policy. OAM performance metric field 112A maps to OAM performance metric field 102A. Threshold field 112C maps to threshold field 102B. Pause time field 112D maps to pause time field 102C.

Defect detection module 78 may apply policies 114 to a monitored tunnel over a WAN to identify defects in the tunnel and apply congestion mechanisms to specified client networks that are using a service (e.g., based FCoE emulation over a pseudowire) running over the tunnel. In this way, different actions may be performed for different clients, depending upon service level agreements (SLAs) between the service provider and the clients or upon clients' management requests for example.

For example, policies 114A, 114E specify respective congestion mechanisms in response to respective Frame Loss Ratio values. However, the Frame Loss Ratio tolerance for client "B" specified in policy 114E is lower than the Frame Loss Ratio tolerance for client "A" specified in policy 114A. Accordingly, policy 114E thus specifies more aggressive congestion detection and congestion mechanisms than policy 114A. Applying policies 114A, 114E to a tunnel, if defect detection module 78 determines a Frame Loss Ratio value for the tunnel is greater than or equal 0.05% but is less than 0.25%, defect detection module 78 applies the action specified by policy 114E to client "B" but does not apply the action specified by client "A." In various examples, client field 112B may specify an attachment circuit, another interface, or another value associated with the client for which the policy is operative. Defect detection module 78 may, for instance, send a PAUSE frame to the specified interface to perform the corresponding action for the policy.

Figure 4:
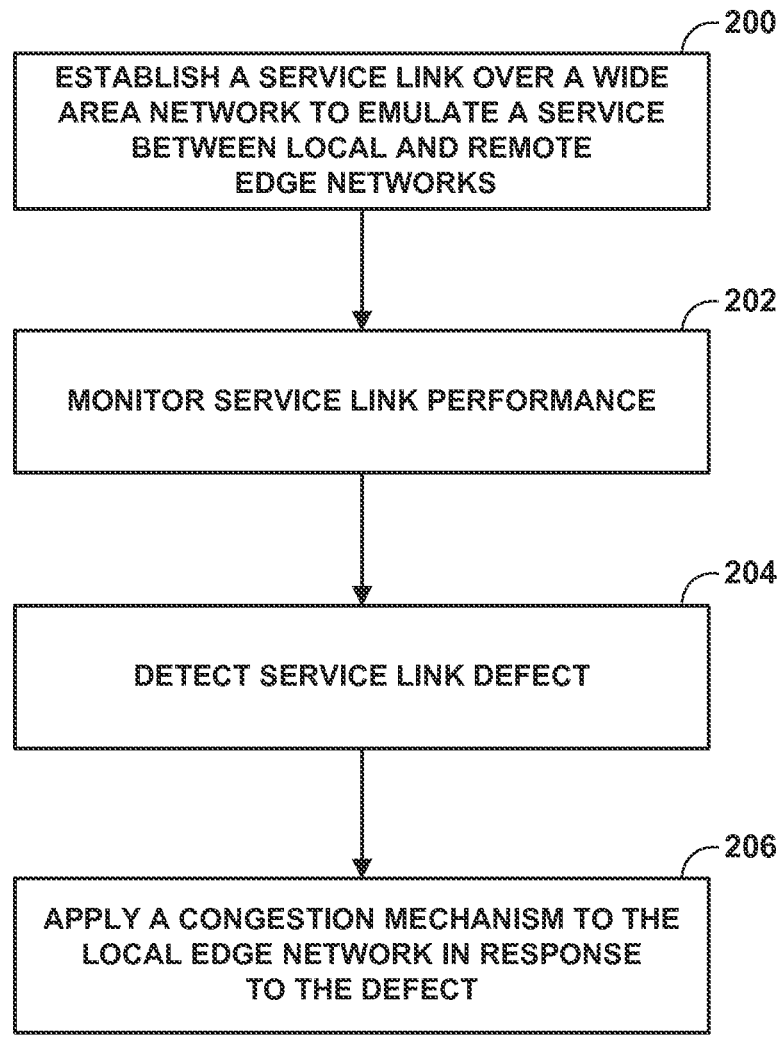
FIG. 4 is a flowchart illustrating an example mode of operation of a provider edge router to monitor performance metrics of a service link and apply congestion mechanisms for an edge network upon identifying service link defects in a manner consistent with techniques described herein.

FIG. 4 is a flowchart illustrating an example mode of operation of a provider edge router to monitor performance metrics of a service link and apply congestion mechanisms for an edge network upon identifying service link defects in a manner consistent with techniques described herein. For purposes of explanation, the example mode of operation is described with respect to PE router 50 of FIG. 2.

Initially, PE router 50 receives configuration data for establishing a service link over a wide area network (200). The service link provides service emulation between a local edge network that is attached to PE router 50 via an attachment circuit associated with the service link and a remote edge network that exchanges service traffic with PE router 50 using the service link. Defect detection module 78 of PE router 50 monitors performance metrics of the service link (202). Upon detecting a defect in the service link (204), defect detection module 78 applies a congestion mechanism to the local edge network (206).

Figure 5:
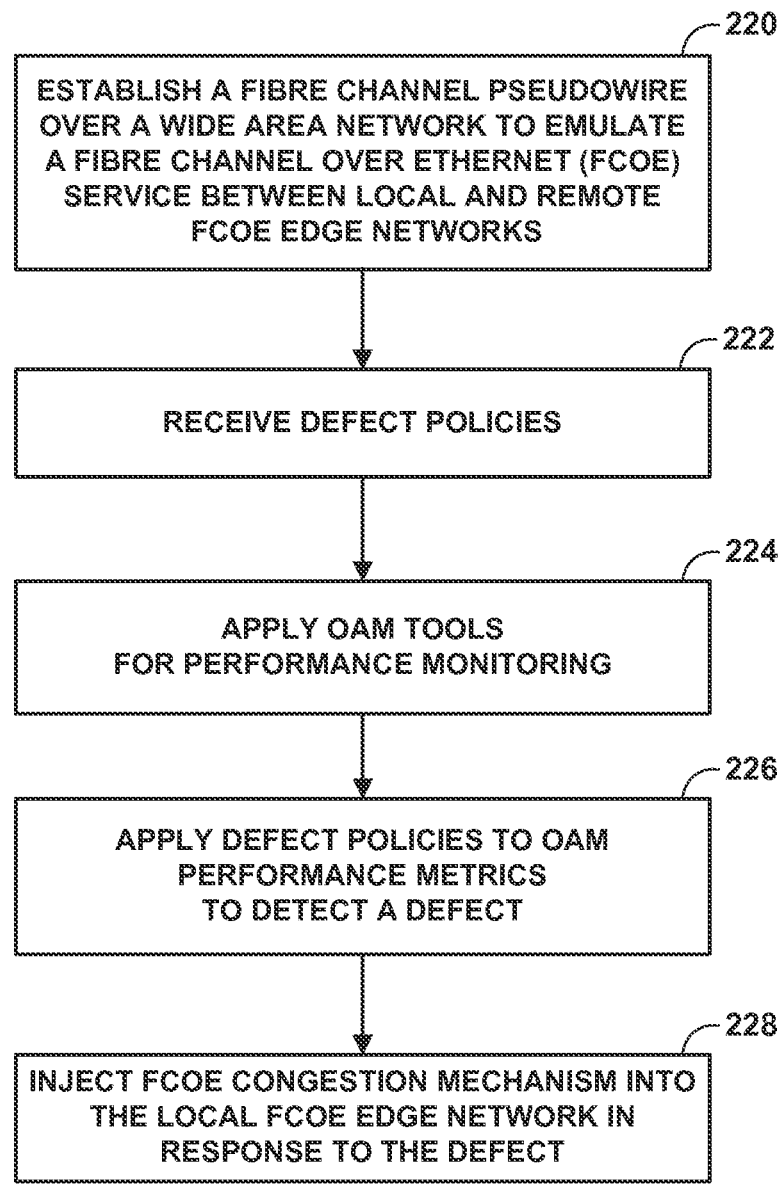
FIG. 5 is a flowchart illustrating an example mode of operation of a provider edge router to monitor performance metrics of a pseudowire that carries FCoE service traffic and inject FCoE congestion mechanisms into an edge network that includes a Lossless Ethernet network upon identifying pseudowire defects.

FIG. 5 is a flowchart illustrating an example mode of operation of a provider edge router to monitor performance metrics of a pseudowire that carries FCoE service traffic and inject FCoE congestion mechanisms into an edge network that includes a Lossless Ethernet network upon identifying pseudowire defects. PE router 50 establishes a Fibre Channel pseudowire across a wide area network to emulate an FCoE service between local and remote edge networks (220). The local edge network includes a Lossless Ethernet network for transporting FCoE traffic and is connected to the pseudowire by an attachment circuit to PE router 50. Management interface 66 receives defect policies 80 that define defect conditions for the pseudowire (222).

Defect detection module 78 of PE router 50 applies OAM tools, such as Frame Loss Ratio and Frame Delay measurement, to the pseudowire emulation link to monitor the performance of the pseudowire (224). Defect detection module 78 applies defect policies 80 to the OAM tool performance metrics to determine the metrics satisfy a defect condition matching at least one of defect policies 80 (226). In response, defect detection module 78 translates the defect condition to an FCoE congestion mechanism specified by the matching policy and injects the FCoE congestion mechanism into the local FCoE edge network via the attachment circuit (228).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:

establishing, by a layer three (L3) network device of an L3 wide area network, a service link from the L3 network device to a remote L3 network device, wherein the service link comprises a pseudowire operating over a tunnel within the wide area network to transport layer two (L2) communications from a local edge network, attached by an attachment circuit to the L3 network device, to a remote edge network attached to the remote L3 network device;

receiving, by the L3 network device from the remote L3 network device, a message that includes a value for determining a performance metric value for loss or delay of the L2 communications being transported by the service link from the L3 network device to the remote L3 network device;

determining, by the L3 network device, the performance metric value satisfies a condition of a first defect policy and does not satisfy a condition of a second defect policy; and by the L3 network device and in response to determining the performance metric value satisfies the condition of the first defect policy and does not satisfy the condition of the second defect policy, applying a congestion mechanism specified by the first defect policy on the attachment circuit to the local edge network, wherein the congestion mechanism specified by the first defect policy at least temporarily reduces an amount of service traffic within the wide area network that is issued by devices of the local edge network.

2. The method of claim 1, further comprising:

monitoring a performance metric of the service link to receive the message, wherein the performance metric value comprises a value for the performance metric.

3. The method of claim 1, wherein the message comprises a first message, the value comprises a first value, and the performance metric value comprises a first performance metric value, the method further comprising:

receiving, by the L3 network device from the remote L3 network device, a second message that includes a second value for determining a second performance metric value for loss or delay of the L2 communications being transported by the service link from the L3 network device to the remote L3 network device;

determining, by the L3 network device, the second performance metric value satisfies the condition of the first defect policy and satisfies the condition of the second defect policy;

by the L3 network device and in response to determining the second performance metric value satisfies the condition of the first defect policy and satisfies the condition of the second defect policy, applying a congestion mechanism specified by the second policy on the attachment circuit, wherein the congestion mechanism specified by the second policy is more severe than the congestion mechanism specified by the first defect policy and at least temporarily reduces the amount of service traffic within the wide area network that is issued by the devices of the local edge network.

4. The method of claim 1,
wherein the pseudowire comprises a Fibre Channel over Ethernet (FCoE) pseudowire for bridging FCoE traffic over the wide area network to emulate an FCoE service for transparently connecting the local edge network to the remote edge network attached to the remote L3 network device,
wherein applying the congestion mechanism specified by the first defect policy comprises injecting an FCoE flow control extension into the local edge network via the attachment circuit to the local edge network.

5. The method of claim 4, wherein the FCoE flow control extension comprises one of an Ethernet PAUSE, Priority-based Flow Control, Enhanced Transmission Selection (ETS), Data Center Bridging eXchange (CDBX), or Congestion Notification (CN) mechanism.

6. The method of claim 1, wherein applying the congestion mechanism specified by the first defect policy comprises injecting an Ethernet PAUSE frame or an Ethernet PAUSE-ON frame into the local edge network via the attachment circuit to the local edge network.

7. The method of claim 1, further comprising: monitoring a performance metric of the service link using an application-independent process,
wherein the performance metric value comprises a value for the performance metric, and
wherein the message conforms to a protocol for the application-independent process.

8. The method of claim 7,
wherein the service link comprises a Fibre Channel over Ethernet (FCoE) pseudowire for bridging FCoE traffic over the wide area network to emulate an FCoE service for transparently connecting the local edge network to the remote edge network attached to the remote L3 network device,
wherein the application-independent process comprises an Operations, Administration and Maintenance (OAM) tool, and
wherein the performance metric of the service link comprises an Ethernet Frame transmission metric over the FCoE pseudowire.

9. The method of claim 1,
wherein the service link comprises a first pseudowire operating over the tunnel,
wherein the attachment circuit comprises a first attachment circuit associated with the first pseudowire, the method further comprising:
establishing, by the L3 network device, a second pseudowire operating over the tunnel to transport L2 communications received by the L3 network device via a second attachment circuit coupled to the L3 network device and associated with the second pseudowire,
wherein the first defect policy is associated with the first attachment circuit and the second policy is associated with the second attachment circuit,
wherein to apply the congestion mechanism specified by the first defect policy on the attachment circuit to the local edge network, the L3 network device, in response to determining the first defect policy is associated with the first attachment circuit, applies the congestion mechanism specified by the first defect policy on the first attachment circuit without applying the congestion mechanism specified by the first defect policy to the second attachment circuit.

10. The method of claim 9, wherein the first and second defect policies specify respective first and second client thresholds for the performance metric of the tunnel.

11. The method of claim 1, wherein the tunnel comprises a Multiprotocol Label Switching Label Switched Path.

12. A layer three (L3) network device of an L3 wide area network, the L3 network device comprising:
a control unit comprising one or more processors;
a management interface of the control unit that receives configuration data defining a service link to a remote L3 network device, wherein the service link comprises a pseudowire operating over a tunnel within the wide area network to transport layer two (L2) communications from a local edge network, attached by an attachment circuit to the L3 network device, to a remote edge network attached to the remote L3 network device, wherein the control unit establishes the service link;
a defect detection module of the control unit that receives, from the remote L3 network device, a message that includes a value for determining a performance metric value for loss or delay of the L2 communications being transported by the service link from the L3 network device to the remote L3 network device,
wherein the defect detection module determines the performance metric value satisfies a condition of a first defect policy and does not satisfy a condition of a second defect policy, and
wherein the defect detection module, in response to determining the performance metric value satisfies the condition of the first defect policy and does not satisfy the condition of the second defect policy, applies a congestion mechanism specified by the first defect policy on the attachment circuit to the local edge network, wherein the congestion mechanism specified by the first defect policy at least temporarily reduces an amount of service traffic within the wide area network that is issued by devices of the local edge network.

13. The network device of claim 12,
wherein the defect detection module monitors a performance metric of the service link to receive the message, wherein the performance metric value comprises a value for the performance metric.

14. The network device of claim 12, wherein the message comprises a first message, the value comprises a first value, and the performance metric value comprises a first performance metric value,
wherein the defect detection module receives, from the remote L3 network device, a second message that includes a second value for determining a second performance metric value for loss or delay of the L2 communications being transported by the service link from the L3 network device to the remote L3 network device,
wherein the defect detection module determines the second performance metric value satisfies the condition of the first defect policy and satisfies the condition of the second defect policy, and
wherein the defect detection module, in response to determining the second performance metric value satisfies the condition of the first defect policy and satisfies the condition of the second defect policy, applies a congestion mechanism specified by the second policy on the attachment circuit, wherein the congestion mechanism specified by the second policy is more severe than the congestion mechanism specified by the first defect policy and at least temporarily reduces the amount of service traffic within the wide area network that is issued by the devices of the local edge network.

15. The network device of claim 12, further comprising:
a pseudowire layer and a native service processing layer of the control unit that execute a Fibre Channel over Ethernet (FCoE) pseudowire of the service link for bridging FCoE traffic over the wide area network to emulate an FCoE service for transparently connecting the local edge network to a remote edge network attached to the remote network device,
wherein the defect detection module applies the congestion mechanism specified by the first defect policy by injecting an FCoE flow control extension into the native service processing layer for transmission to the local edge network via the attachment circuit to the local edge network.

16. The network device of claim 15, wherein the FCoE flow control extension comprises one of an Ethernet PAUSE, Priority-based Flow Control, Enhanced Transmission Selection (ETS), Data Center Bridging eXchange (CDBX), or Congestion Notification (CN) mechanism.

17. The network device of claim 12, wherein the defect detection module applies the congestion mechanism specified by the first defect policy by injecting an Ethernet PAUSE frame or an Ethernet PAUSE-ON frame into the local edge network by an attachment circuit that attaches the local edge network to the service link at the network device.

18. The network device of claim 12, wherein the monitors a performance metric of the service link using an application-independent process,
wherein the performance metric value comprises a value for the performance metric, and
wherein the message conforms to a protocol for the application-independent process.

19. The network device of claim 18,
wherein the service link comprises a Fibre Channel over Ethernet (FCoE) pseudowire for bridging FCoE traffic over the wide area network to emulate an FCoE service for transparently connecting the local edge network to the remote edge network attached to the remote L3 network device,
wherein the application-independent process comprises an Operations, Administration and Maintenance (OAM) tool, and
wherein the performance metric of the service link comprises an Ethernet Frame transmission metric over the FCoE pseudowire.

20. The network device of claim 12,
wherein the service link comprises a first pseudowire operating over the tunnel,
wherein the attachment circuit comprises a first attachment circuit associated with the first pseudowire,
wherein the control plane establishes a second pseudowire operating over the tunnel to transport L2 communications received by the L3 network device via a second attachment circuit coupled to the L3 network device and associated with the second pseudowire,
wherein the first defect policy is associated with the first attachment circuit and the second policy is associated with the second attachment circuit,
wherein to apply the congestion mechanism specified by the first defect policy on the attachment circuit to the local edge network the defect detection module, in response to determining the first defect policy is associated with the first attachment circuit, applies the congestion mechanism specified by the first defect policy on the first attachment circuit without applying the congestion mechanism specified by the first defect policy to the second attachment circuit.

21. The network device of claim 20, wherein the first and second defect policies specify respective first and second client thresholds for the performance metric of the tunnel.

22. The network device of claim 12, wherein the tunnel comprises a Multiprotocol Label Switching Label Switched Path.

23. A system comprising:
a wide area network comprising a provider edge (PE) router to establish a Fibre Channel over Ethernet (FCoE) pseudowire over the wide area network to a remote PE router of the wide area network;
a Lossless Ethernet network to attach, by an attachment circuit, to the FCoE pseudowire at the PE router;
a Fibre Channel Fabric connected to the Lossless Ethernet network and to a storage device that provides data for transmission over the wide area network by the FCoE pseudowire,
wherein the PE router receives, from the remote PE router, a message that includes a value for determining a performance metric value for loss or delay of FCoE traffic being transported by the FCoE pseudowire from the PE router to the remote PE router, and
and wherein the PE router, in response to determining the performance metric value satisfies a condition of a first defect policy and does not satisfy a condition of a second defect policy, injects an FCoE flow control extension specified by the first defect policy into the Lossless Ethernet network via the attachment circuit.

24. The system of claim 23, further comprising:
a customer edge device of the Lossless Ethernet network to receive and forward the FCoE flow control extension toward a server of the Lossless Ethernet network to direct the server to temporarily cease transmitting FCoE traffic in response to the detected defect.

25. The system of claim 23, wherein the FCoE flow control extension comprises an Ethernet PAUSE frame or an Ethernet PAUSE-ON frame.

* * * * *